United States Patent

[11] 3,596,098

| [72] | Inventor | Gunter Stetter<br>Munich, Germany |
|---|---|---|
| [21] | Appl. No. | 852,994 |
| [22] | Filed | Aug. 25, 1969 |
| [45] | Patented | July 27, 1971 |
| [73] | Assignee | Bolkow Gesellschaft mit beschankter Haftung<br>Ottobrunn, near Munich, Germany |
| [32] | Priority | Aug. 14, 1965 |
| [33] | | Germany |
| [31] | | B 83 268 |
| | | Continuation of application Ser. No. 570,511, Aug. 5, 1966, now abandoned. |

[54] INFRARED RADIATOR SOURCE CONTAINING A CHARGE OF PYROTECHNIC INCANDESCENT MATERIAL
9 Claims, 6 Drawing Figs.

[52] U.S. Cl............................................... 250/85,
219/354, 219/553
[51] Int. Cl............................................... H01j 35/00
[50] Field of Search........................................ 250/84, 85;
219/354, 553; 102/31

[56] References Cited
UNITED STATES PATENTS
| 2,933,317 | 4/1960 | Pittinger et al. .............. | 250/85 X |
| 3,275,829 | 9/1966 | McClune et al. .............. | 250/85 |

Primary Examiner—William F. Lindquist
Assistant Examiner—A. L. Birch
Attorney—McGlew & Toren ABSTRACT: An infrared radiator comprises a light weight container such as a cylinder which is filled with a pyrotechnic material capable of emitting radiation energy immediately after ignition and without noticeable gas development. The cylinder is closed at one end by a metal plate such as a thin steel disc having very little heat capacity of its own and having an exposed surface providing a radiation surface or emitting surface and an opposite surface facing toward the interior of the container which is in direct heat contact with the pyrotechnic radiator.

PATENTED JUL 27 1971

INVENTOR
Günter Stetter
By
ATTORNEYS

INFRARED RADIATOR SOURCE CONTAINING A CHARGE OF PYROTECHNIC INCANDESCENT MATERIAL

This application is a continuation of U.S. Pat. Application Ser. No. 570,511 filed Aug. 5, 1966 and now abandoned.

This invention relates, in general, to the construction of infrared radiator devices and, in particular, to a new and useful infrared radiator which can be used independently of an external source to emit preferably an invisible wave radiation within the infrared spectral region.

Infrared radiators are used with automotive bodies so that the body carrying it will be visible for an infrared orientation instrument working in this spectral region. Infrared orientation instruments are used for automatically and continuously determining the respective position coordinate of a body carrying the radiator. Such infrared orientation instruments usually operate in relatively narrow spectral regions, for example, in the region of about 1.8 to 0.25 or from 3 to 5μ, the so-called atmospheric windows. Such orientation instruments also frequently include an infrared image chamber permitting the visual observation of the vicinity of the body and such changes work in the spectral region of about 0.7 to 1.2μ.

Up to the present time, so-called pyrotechnic flame radiators have been used for the production of the infrared radiant energy necessary for such radiators. With such devices, hot combustion gases of a pyrotechnic combustion composition, for example, on a magnesium basis, serve as the radiation source proper. The pyrotechnic combustion composition is arranged in a tubular receptacle and burns down from one front side. Since the very hot flame which is generated has a substantially larger surface than the outlet opening of the receptacle, it is possible, with relatively small dimensions of the combustion composition, to obtain a high total output radiated per unit of space angle and measured in W. sterad, which is available during a limited time, that is, the combustion time of the pyrotechnic combustion composition. Such pyrotechnic flame radiators are also referred to as flares and they correspond in their spectral distribution of the radiated total energy in the first approximation to a block body whose temperature corresponds to the temperature of the flame.

Thus, at a high flame temperature of about 2,000° C., the radiation maximum is about a wave length of 1μ. Tests have shown that it is not possible to considerably increase the intensity of the desired spectral region within the radiated infrared spectral region such as by using admixtures to provide changes compared to corresponding spectral regions of pure incandescent luminous radiators. It is also impossible to suppress emissions in the undesired spectral regions by the attachment of optical filters. First of all, there are no filters known which can withstand the thermal load of the flame radiator, and secondly, such a filter would have to be arranged at a great distance from the radiator, due to the large surface of the flame. Such an arrangement cannot be realized, at least for use with flying bodies or missiles, for aerodynamic reasons.

Thus, with devices known at the present time, pyrotechnic flame elements, it is not possible to radiate a very high power in a certain infrared spectral region in which the orientation instrument works while producing as little radiation power as possible in the rest of the spectral region. It is particularly desirable to reduce the radiation in the spectral region of image converters and in the range of the visible spectral light which is necessary in order to prevent a marksman using the image converter of the orientation instrument from being blinded, particularly at night, by such infrared radiators. It is also undesirable to have an infrared radiation of such brilliance that the infrared radiator would outshine the object being visible on the screen of the image converter.

Pure incandescent luminous radiators have been suggested as infrared radiators, for example, in the form of a conical or cylindrical metal body of great heat capacity, which, based on the principle of the black body, is heated by a pyrotechnic incandescent composition and which transmits its thermal energy to a cavity having an opening through which the radiation is emitted. With such a radiator, it is possible to arrange the intensity maximum of the emitted radiation in the desired spectral regions by selection of the corresponding temperature. However, the application of such a principle has the disadvantage that the total power output per surface unit of the radiator diminishes so considerably with the reduction of the radiator temperature that the gain of radiation in the spectral region which is achieved by the displacement of the intensity maximum to the desired spectral region is more than offset. With a reduction of the radiator temperature from 2000° C., for example, to 1000° C., the intensity maximum is displaced from 1.4μ to 2.2μ but the output in W/cm². μ drops at 2.2μ by a factor of about 10.

When using these radiators in the desired spectral regions, the available total energy radiation is only partly utilized. In order to have sufficient radiation energy available in the desired wave region, there is only one possibility, and that is, to increase the radiation surface. But there are limits to this increase. The specification weight in grams of expended weight per W/sterad radiated output in the desired spectral region, is thus very unfavorable and prevents, in most cases, its use on connection with missiles or projectiles. In addition, the maximum radiation intensity in the desired spectral region must be available after a relatively short warmup period for the purpose in question, particularly when infrared radiators are used in connection with missiles.

In accordance with the present invention, there is provided an infrared radiator for the infrared spectral region which consists of a radiation emitting metal body and an energy source arranged in back of the body for heating it. A metal plate serves as a so-called nonblack body and includes on surface forming a radiation surface and has an opposite surface in direct thermal contact with the energy source of high thermal capacity. The energy source operating temperature is selected in dependence on the desired spectral region and the desired intensity of the radiation to be emitted. Thus, the invention provides an infrared radiator of high specific power, whose radiation maximum is in the desired infrared spectral region, preferably of about 1.5 to 2.7μ without emitting at the same time considerable radiation energy in undesired wave regions. The desirable characteristics of the inventive infrared radiator is obtained by making the radiation intensity of the radiator adjustable within certain limits as a function of time.

Starting from the known fact that the temperature of an infrared radiator is so selected that the maximum of the spectral distribution of the emitted radiation is in accordance to Wien's displacement law in the desired spectral region, so that there is relatively little radiation power in the remaining spectral region due to the unknown spectral distribution of an incandescent luminous radiator, the problem of the present invention is solved by providing a metal plate of low characteristic thermal capacity which acts as a so-called nonblack body which is used as an infrared radiation source. The plate is arranged with a nonradiating surface in direct contact with an energy source of high thermal capacity whose temperature is selected as a function of the desired spectral region and of the desired intensity of the radiation to be emitted. In the case of orientation by means of an infrared orientation instrument working with lead sulfide cells as detectors, this temperature is, for example, about 1100° C. and the maximum radiant power is in the spectral region of about 1.8 to 2.5μ.

According to a preferred embodiment of the invention, the metal plate is formed as a very thin sheet metal disk and the energy source is a known pyrotechnic incandescent composition arranged in a cup-shaped receptacle and which can give off a thermal energy without any considerable evolution of gas. The thin sheet metal disk serving as a nonblack body can be used as a cover for the cup-shaped receptacle containing the incandescent composition. The walls of the receptacle are provided with a heat damming coat. A fuse which is necessary for starting the infrared radiator is arranged preferably in a narrow sidewall of the cup-shaped receptacle. In this surprisingly simple manner, there is obtained a large surface infrared radiator whose radiant energy fills to a maximum amount the desired spectrum within the infrared region without emitting substantial radiant energy in undesired regions. Due to the low thermal capacity of the metal disk. representing the radiator proper, this infrared radiator can emit the desired radiation immediately after the ignition of the incandescent composition. When using a pyrotechnic composition, which gases very little or not at all upon being ignited, it is also possible to design the infrared radiator in a hitherto unknown flat and compact form and to use even more complicated shapes than a simple round contour.

A further advantage of the infrared radiator of the present invention is that it is also possible to use optical filters with the radiator. Such filters may be attached in front of the side of the metal place which emits the radiation, since there is no admission with hot gases in contrast to flame radiators. In addition, the radiating surface is not larger than the surface of the metal disc so that it may be easily covered by a filter. Between the metal disc and the filter there is merely a small interval required to permit thermal expansion of the metal disk. When the device is used with missiles, there is a particular advantage in the filter arrangement because it prevents the cooling of the radiating surface by the air eddies produced by the movement of a missile.

In some instances, it is desirable to provide the infrared radiator with an oxide coat or a silicon carbide coat in order to increase the radiant power. The remote surface, which is in contact with the incandescent composition, may be provided with a heat bridge, for example, in the form of pins which extend into the incandescent material in order to enhance the heat transfer between the composition and the metal disk and thus reduce the time at which the radiation intensity is increased to the desirable amount, and to increase the efficiency of the utilization of such energy.

In some instances, it is also desirable to influence the radiation distribution of the metal disk by optical parts such as lenses, for example. In many instances, it is also desirable to arrange the incandescent composition in several distinct chambers in order to influence the time for the generation of the desired radiation intensity for the characteristics of the radiation which is emitted. For example, the chambers may be ignited in succession, if desired.

Accordingly, it is an object of the present invention to provide an improved radiator for generating infrared emissions in a desired spectral range.

A further object of the invention is to provide an infrared radiator, which includes a thin metal plate forming a so-called nonblack body which has a low characteristic thermal capacity and which is arranged with a radiating surface disposed outwardly and with an opposite surface in direct contact with an energy source of high thermal capacity having a temperature selected in dependence on the desired spectral region and the desired intensity of the radiation to be emitted.

A further object of the invention is to provide a radiator having a thin plate forming a radiation element which is in direct contact with a pyrotechnic incandescent composition which is advantageously arranged in one or more chambers behind the plate.

A further object of the invention is to provide a radiator which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 2 is a partial elevational view of an alternate embodiment of a plate construction;

Figure 1:
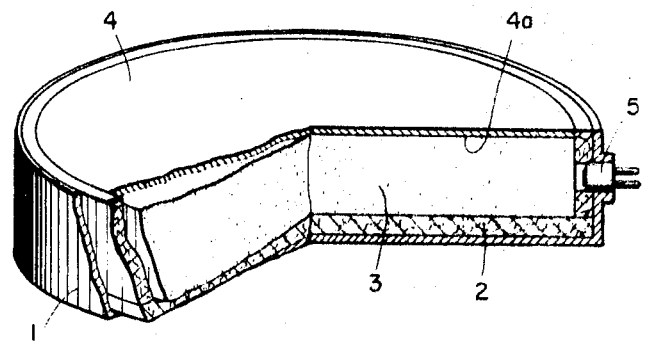
FIG. 1 is a perspective view partly in section of an infrared radiator constructed in accordance with the invention.

Referring to the drawings, in particular, the invention as embodied therein in FIG. 1 includes an infrared radiator comprising a substantially cup-shaped receptacle or housing 1 preferably made of a thin steel plate of 0.5 mm. thickness, for example. The interior of the housing is provided with a heat damming coat 2 of double thickness which is formed around the bottom and sidewalls and is advantageously made of a material such as asbestos. The interior of the receptacle 1 is filled with a known pyrotechnic composition 3 which is of a type which will evolve very little gas during its heat generation reaction. Similar pyrotechnic compositions are generally used as heating means, for example, for foods preserved in cans.

In accordance with the invention, the opened side of the receptacle 1 is closed pressure tight by a thin metal disk 4 forming the so-called nonblack body proper. The disk 4 is advantageously made, for example, of a metal such as steel, tungsten or molybdenum. The radiation side of the disk 4 is exposed and the nonradiating side 4a is arranged to face the composition 3 and is in direct heat contact with the latter.

On the narrow side of the receptacle, there is provided an opening in which is located a fuse 5 for igniting the pyrotechnic composition. Though only one fuse 5 is indicated, it is sometimes desirable to employ several fuses arranged, for example, around the periphery of the walls such as at diametrically opposite locations.

Figure 3:
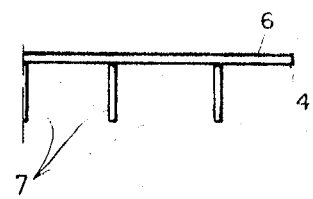

The outer surface of the radiating surface of the metal disk 4, which is advantageously of 0.5 mm. thickness, can be bright or provided with a coating depending on the intended use. In the embodiment of FIG. 3, the plate 4' is provided with a silicon carbide coat or with an oxide coat 6. In addition, the metal radiating disk 4' is provided with a plurality of extensions or projecting element 7 which extend into the composition 3 and are tightly enclosed with the latter. In this manner, a better and faster heat transfer from the composition 3 to the metal disk 4 can be obtained.

Figure 2:
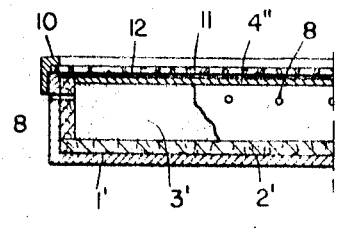
FIG. 2 is a partial sectional view of another embodiment of an infrared radiator.

As indicated in the embodiment of FIG. 2, when using incandescent compositions 3', which are not quite free of gas, it is advisable to provide the shell of the housing with openings 8 which are arranged around the sidewall through which the gas formed during the burning of the composition can escape. Care must be taken that these openings are sealed moistureproof before the infrared radiator is started. This can be effected, for example, by means of bursting diaphragms (not shown) which normally close the opening 8 but which will be ruptured after ignition. It is also desirable to equip the receptacle 1' with an expansion chamber to absorb any possible volume changes of the composition. In the embodiment of FIG. 2, the infrared plate 4'' is held in position by means of an annular fastening collar 10 and a spectral filter 11 is arranged in front of the disk 4. Between the metal disk 4 and the spectral filter 11 there is arranged a plurality of spacer elements or a single spacer grid 12 to prevent damage to the spectral filter by deformation of the disk 4''. The filter has about the same surface as the metal disk 4'' while its distance from the emitting surface is less than 1.5 centimeters. By means of the filter, which can also be combined with interference filters, it is possible to suppress undesirable spectral portions of the emitted radiation so that incandescent compositions of higher temperatures can also be employed.

Figure 5:
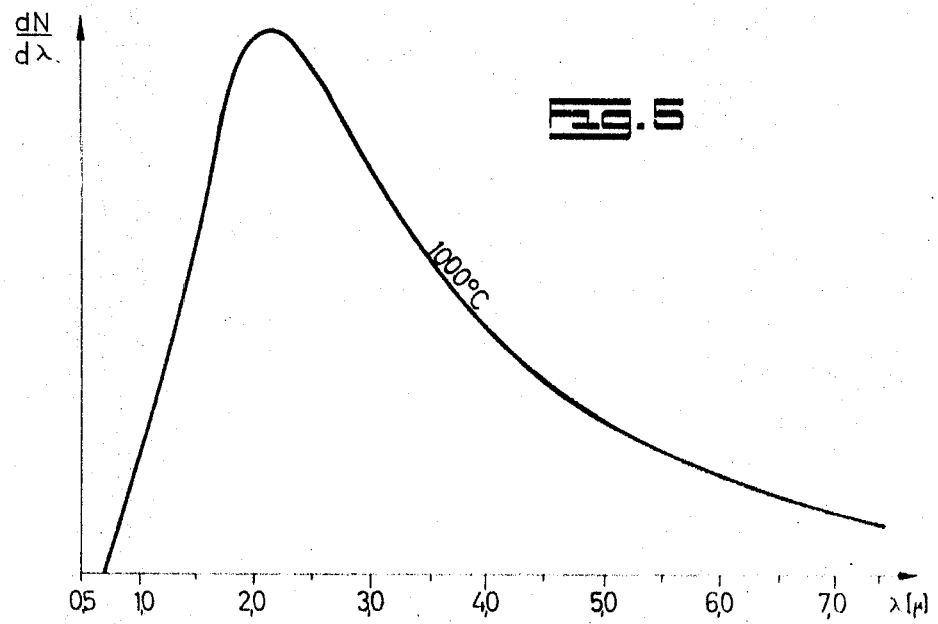
FIG. 5 is a curve indicating the spectral power distribution of the radiation emitted by an infrared radiator according to the construction of FIG. 1.

When the composition 3 is ignited by actuating the fuse 5, the pyrotechnic composition 3, as indicated in FIG. 1, starts to grow very rapidly, and gives off its heat to the metal disk 4 which is thus heated during the glowing of the composition 3 to about 1100° C. The disk 4 emits a wave radiation in the infrared spectral region of about 2.2µ whose energy distribution over the wave length $a$ is represented in FIG. 5.

Figure 4:
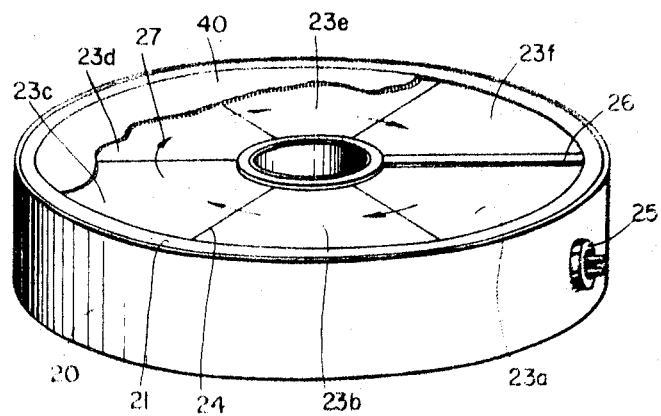
FIG. 4 is a perspective view partly in section of another embodiment of the invention.

In the embodiment represented in FIG. 4, the infrared radiator consists of a receptacle 20 having the form of a circular ring or cylinder which is provided with a heat damming coat 21 of the same configuration. The pyrotechnic composition is divided into individual segments 23a, 23b, 23c, 23d, 23e and 23f which are arranged in the compartment of the receptacle formed between thin partition walls 24.

On the narrow side of the receptacle 20, there is provided an opening for fuse 25 which merely ignites one segment, for example, the segment 23a. In order to ensure the direction of ignition for the ignition of the other segments, the partition between the segments 23a and 23f is provided with an additional heat damming coat 26. In this manner, the progressive ignition of the pyrotechnic composition is enforced in the direction of the arrows 27. The ignition delay between the individual segments can be defined by determining the thermal conductivity of an ignition point in the respective partition 24. Naturally, a reaction in the direction of the arrows 27 is also possible without the partition 24, that is, only by means of the damming coat 26. The installation of a partition 24 depends on the reaction velocity of the respective composition used. Each segment can also be provided with a separate fuse for its release which is controlled electronically by means not represented.

The pyrotechnic composition is also contacted and the receptacle is closed by a thin metal disc 40 in the embodiment of FIG. 4 as in the other embodiments. Disc 40 acts as a non-black body which serves at the same time as a cover for the receptacle 20.

Figure 6:
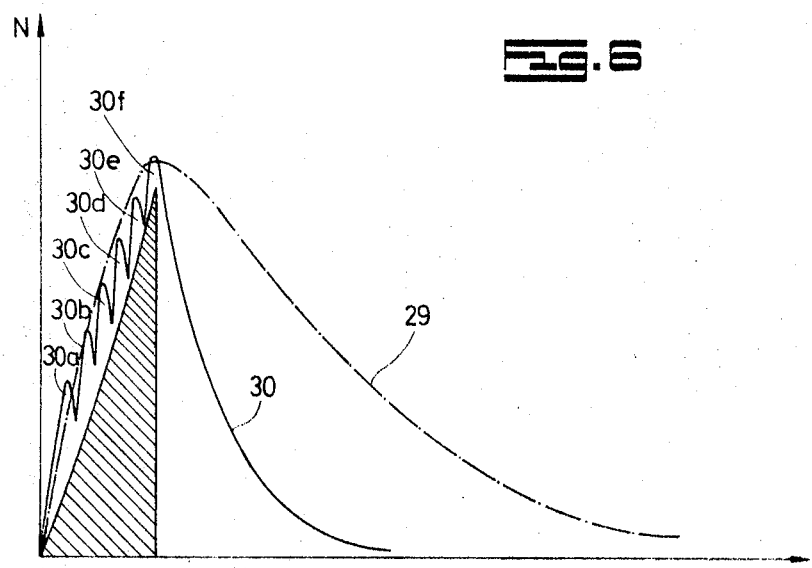
FIG. 6 indicates the power distribution over a period of time of an infrared radiator constructed in accordance with FIGS. 1 and 4.

The embodiment shown in FIG. 4 is particularly suitable for meeting requirements regarding the time dependent power behavior of a radiator. The cross-sectional area indicated in FIG. 6 indicates the time dependent power behavior of the radiator when used in connection with missiles. In the embodiments represented in FIGS. 1 to 3, the power course 29 represented by the dot-dashed lines in FIG. 6 is necessary in order to ensure that nominal power is generated as represented in FIG. 6 as the cross hatched triangle. As it can be seen, a considerable energy portion of the radiation produced remains unused by the power dying out according to an $e$ function.

Due to the successive ignition of the segments of the pyrotechnic composition in the embodiment of FIG. 4, there is a time overlap by the radiation caused by the glowing of the individual segments. If the time constant of the segments become at the same time smaller in the embodiment according to FIGS. 1 to 3, the radiant power 30 is obtained (FIG. 6) as a function of the time by the individual radiant powers 30a, 30b, 30c, 30d, 30e and 30f of the segments. This curve approaches the hatched triangle substantially better due to the time overlap than does the dot-dashed line 29 of the embodiment according to FIGS. 1 to 3.

As can be seen from the above considerations, the radiators are characterized by surprisingly low construction expenditure. The maximum of their effective radiant energy is within the desired spectral region as can be seen from FIG. 5. Undesired spectral portions can be completely suppressed, if necessary, by using the filters as pointed out previously. Such an infrared radiator has a very favorable specific weight and is therefore particularly suitable for use in connection with missiles. Due to the possible combination with filters and optical parts and lenses, any desired spectral and spatial power distribution of the radiation to be emitted can be achieved with regard to the available infrared orientation instruments and this was not possible up to the present time with the present infrared radiators.

While specific embodiments of the invention have been shown and described in detail to illustrate the application of the inventive principles, it will be understood that the invention may be embodied otherwise without departing from such principles.

What I claim is:

1. An infrared radiator comprising a lightweight, substantially flat and shallow cup-shape receptacle having a substantially flat and circular base and a shallow substantially cylindrical rim, a lining of heat damming material on the inner surfaces of said base and rim, a substantially cylindrical charge of pyrotechnic incandescent material, capable of giving off its thermal energy without any substantial evolution of gas, filling said lining and having a substantially flat and circular exposed surface, and a thin flat substantially circular metal plate in surface contact with and completely covering and enclosing said exposed surface and having an exposed outer surface, and tightly closing said receptacle, said plate being substantially instantly heated to incandescence upon ignition of said charge whereby the exposed outer surface of said plate constitutes the source of infrared radiation.

2. An infrared radiator, according to claim 1, including means defined in said receptacle for permitting expansion of the gases therewithin.

3. An infrared radiator, according to claim 1, including at least one spectral filter arranged in front of the radiating surface of said metal plate.

4. An infrared radiator, according to claim 3, wherein said filter is arranged at a distance of less than 1½ centimeters from the radiating surface of said metal plate.

5. An infrared radiator, according to claim 1, wherein said metal plate is provided with a plurality of extensions extending into said energy source and serving as heat bridges.

6. An infrared radiator, according to claim 1, including means arranged in front of the radiating surface of said metal plate for influencing the distribution of the emitted radiation.

7. An infrared radiator, according to claim 1, wherein said metal plate exposed radiating surface is provided with a coating of an oxide material.

8. An infrared radiator, according to claim 1, wherein said receptacle includes a plurality of openings therein for the escape of gas therefrom upon burning of said pyrotechnic material.

9. An infrared radiator, according to claim 1, wherein said pyrotechnic incandescent material is subdivided within said receptacle into a plurality of individual segments of said material, said segments being arranged in a row for ignition individually in succession.